United States Patent [19]

Shih

[11] Patent Number: 5,392,157
[45] Date of Patent: Feb. 21, 1995

[54] LINE-OF-SIGHT STEERING SYSTEM FOR HIGH POWER LASER BEAMS AND METHOD USING SAME

[75] Inventor: Chun-Ching Shih, Palos Verdes Estates, Calif.

[73] Assignee: TRW Inc., Redondo Beach, Calif.

[21] Appl. No.: 108,489

[22] Filed: Aug. 18, 1993

[51] Int. Cl.6 ........................ G02B 27/10; G02B 26/08
[52] U.S. Cl. ................................. 359/625; 359/623;
359/629; 359/639; 359/196; 359/210
[58] Field of Search ............... 359/618, 623, 625, 626,
359/627, 629, 636, 639, 641, 663, 677, 741, 744,
754, 796, 797, 131, 196, 209, 210, 399, 433;
372/33, 9, 29, 101

[56] References Cited

U.S. PATENT DOCUMENTS

| | | | |
|---|---|---|---|
| 5,015,080 | 5/1991 | Cassarly et al. | 359/196 X |
| 5,059,008 | 10/1991 | Flood et al. | 359/721 X |
| 5,107,357 | 4/1992 | Cassarly et al. | 359/94 |
| 5,270,859 | 12/1993 | Wirth et al. | 359/622 |
| 5,291,334 | 3/1994 | Wirth et al. | 359/622 |

*Primary Examiner*—Brian Healy
*Attorney, Agent, or Firm*—S. L. Goldstein

[57] ABSTRACT

In accordance with the teachings of the present invention, a system and method are provided for steering a beam of optical radiation. The system includes a dividing telescope microlens array for receiving a beam of optical radiation directed along a first path and dividing the beam into a plurality of divided beam columns. A steering microlens array collectively redirects each of the divided beams along a second path. The system further includes a compensation lens for compensating for phase differences which may otherwise exist among the redirected divided beam columns. The redirected divided beams are then combined by way of a combining microlens array to provide a recombined far-field beam of optical radiation directed along the second path.

21 Claims, 2 Drawing Sheets

LINE-OF-SIGHT STEERING SYSTEM FOR HIGH POWER LASER BEAMS AND METHOD USING SAME

BACKGROUND OF THE INVENTION

1. Technical Field

This invention relates generally to directed energy beam steering systems and, more particularly, to an optical beam steering system having microlens arrays and a phase compensating lens for steering high power optical beams.

2. Discussion

The ability to achieve fast retargeting over a wide field of view has become an important issue for strategic and tactical optical targeting applications, especially those involving moderate to high power laser systems. For military purposes, retargeting speeds are an important factor in determining the effectiveness of a laser system in targeting and killing a sufficient number of targets within a wide field of view over a limited time frame. In addition, fast retargeting is desirable for laser systems commonly employed for other space-related applications such as laser communications applications which typically require beam agility with small size and low weight components. In order to accomplish fast retargeting, it is generally necessary to employ a beam steering system which redirects an optical beam along a desired path.

In the past, many of the early conventional beam steering systems commonly required a rather complicated rotating mechanism to move a large focusing mirror around a rotation region. According to such conventional approaches, the steering system response is generally inversely scaled to the size of the focusing mirror. However, high power optical beams generally require a relatively large mirror to effectively redirect the energy beam. The requirement of a large mirror leads to a slow steering response, especially for wide-angle steering applications in which more mirror movement is generally required. Accordingly, in order to obtain high power wide-angle cost-effective beam steering, there existed a need for a beam-directing system which could provide improved response time and simplified control mechanisms.

Presently, there exists a microlens beam steering system which includes the translation of two microlens arrays configured as a telescope array. Such a system is described in a technical paper by Flood et al, entitled "Continuous Wide Angle Beam Steering Using Translation of Binary Microlens Arrays and a Liquid-Crystal Phased Array", published in SPIE Proceeding Volume 1211, pages 296–304, (1990). This technical paper is hereby incorporated by reference. Using this type of microlens beam steering technique, an optical beam is separated into a plurality of beam columns, each of which passes through a microlens in the microlens array. Translational movement of the microlens arrays provides the ability to steer the plurality of beam columns collectively. To complete the beam steering, the steered beams are then recombined to provide a redirected far-field beam. According to this approach, wide-angle beam steering is achieved with a relatively small translational movement which generally requires movement of only a fraction of the size of the microlens.

While the above-described microlens array beam steering approach provides a number of advantages over the prior rotating mirror beam-directing systems, a number of drawbacks still exist. First, the plurality of steered beam columns generally are not uniformly in phase with one another, with the exception of certain discrete steering angles. As a consequence, the resulting far-field beam intensity will generally be rather low, unless the beam columns can be uniformly brought back into phase with one another. A second drawback associated with some of the prior approaches involves the existence of interference which is commonly present among adjacent beam columns and steering lenses.

The above-identified article further discloses a method using a liquid-crystal phase-modulated array for providing phase compensation among the beam columns so as to eliminate some of the discrete steering angle limitations. However, the liquid-crystal arrays usually require individual transistors located in each subaperture to control the voltage applied thereto. This requirement unduly complicates the control system. In addition, liquid crystals are generally not desirable materials for use with moderate to high power laser beam applications. That is because liquid crystal is generally known to have a rather low optical damage threshold and therefore is easily susceptible to damage such as that caused by burning. Furthermore, liquid crystal is currently a rather costly material.

It is therefore desirable to provide for an improved beam steering system which does not suffer from the above described drawbacks commonly found with conventional approaches. In particular, it is desirable to provide for a laser beam steering system having a microlens array which compensates for phase differences between laser beam columns so as to provide phase compensation therebetween. In addition, it is desirable to provide for such a beam steering system which has a wide-angle and high-speed response and a more simplified control scheme.

SUMMARY OF THE INVENTION

In accordance with the teachings of the present invention, a system and method are provided for steering a beam of optical radiation. The system includes a dividing telescope microlens array which receives a beam of optical radiation directed along an input path. The dividing telescope array includes first and second microlens arrays for dividing and separating the beam into a plurality of beam columns. A steering telescope microlens array collectively steers and recombines each of the divided beam columns into a steering path. The steering telescope array includes a first microlens array for steering the beam columns from the dividing telescope array and a second microlens array for recombining the beam columns into a single steered beam. The system further includes a compensation lens positioned between the dividing telescope array and the steering telescope array which compensates for phase differences which may otherwise be present among the divided beam columns.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENT

Figure 1:
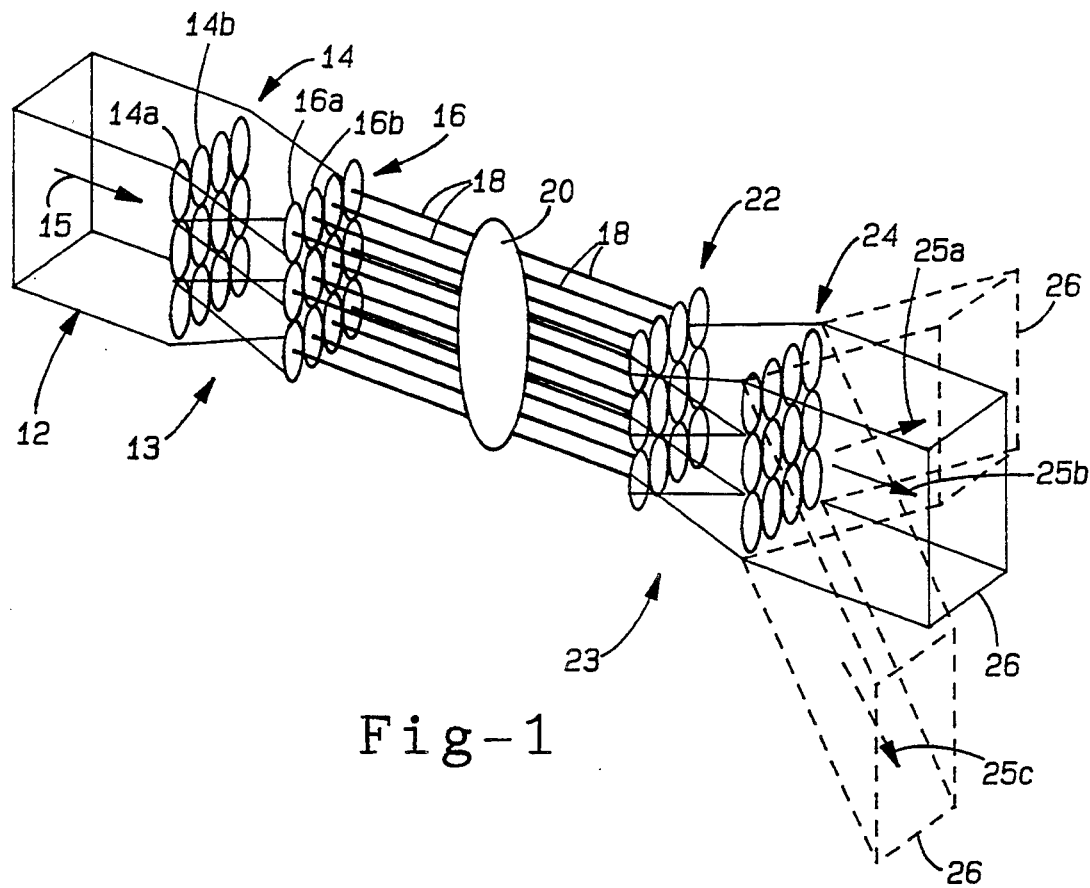
FIG. 1 is a perspective representation of a wideband beam steering system in accordance with the present invention.

Turning to FIG. 1, a beam steering system 10 is shown therein in accordance with the present invention. The beam steering system 10 employs a microlens array approach which includes telescope arrays arranged so as to achieve enhanced wide-angle high speed beam steering. Beam steering system 10 is particularly suited to handle medium to high power optical beams such as those produced with a high power laser system. Generally speaking, the beam steering system 10 as described herein advantageously provides enhanced steering of optical beams by employing a simplified control scheme to compensate for phase variations.

In particular, the beam steering system 10 includes a dividing telescope array 13 which is made up of two confocal binary microlens arrays 14 and 16 for dividing an optical beam 12 into a plurality of divided beam columns 18. Each of the conical microlens arrays 14 and 16 includes a plurality of microlenses such as 14a, 14b, 16a and 16b arranged so that one microlens 14a from the array 14 is optically coupled or aligned with one microlens 16a from the array 16. The optically coupled pairs of microlenses operate to provide a dividing focus with a magnification of less than one. Accordingly, the dividing telescope array 13 receives a beam of optical radiation 12 directed along an input path 15 and focuses the beam 12 so as to divide and separate the beam 12 into the plurality of divided beam columns 18.

The divided beam columns 18 are thereafter projected substantially parallel to one another in the general direction of the path 15. The divided beam columns 18 are separated from one another by a distance sufficient to allow for a desired range of beam steering without unduly suffering from interference among adjacent beam columns. This is because the amount of steering range is generally dependent upon the separation distance between adjacent beams. Therefore, smaller sized beam columns generally allow for great distances therebetween which in turn allow for a larger steering range. However, the beam column size should not be too small because the beam profile may begin to degrade within a short distance of propagation.

The beam steering system 10 also includes a steering telescope array 23 for collectively steering each of the divided beam columns 18 along a steering path 25 at a steering angle $\theta$. Further, the steering telescope array 23 controls the divided beam columns 18 to form a steered far-field beam 26. The telescope array 23 includes a steering microlens array 22 which is made up of a plurality of steering microlenses arranged so that each microlens is aligned with and receives one of the divided beam columns 18. Each microlens has a surface with an aperture larger than the cross-sectional area of the beam column 18 received therewith. As will be discussed below, the microlens array 22 is moved to cause the collective steering of the beam columns 18. Additionally, the steering telescope array 23 includes a combining microlens array 24 which receives the individual beams from the array 22 and combines these beams into the single steered beam 26.

Figure 2:
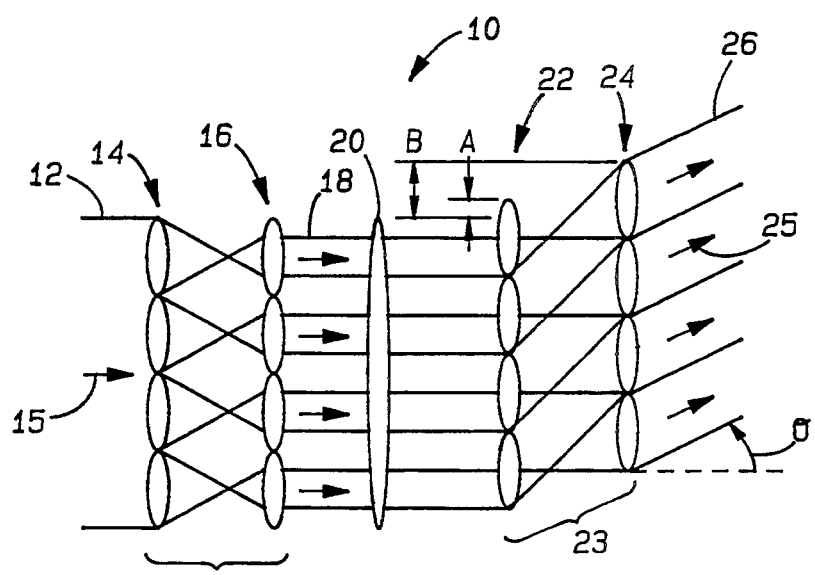
FIG. 2 is a two-dimensional representation of the system of FIG. 1.
Figure 3:
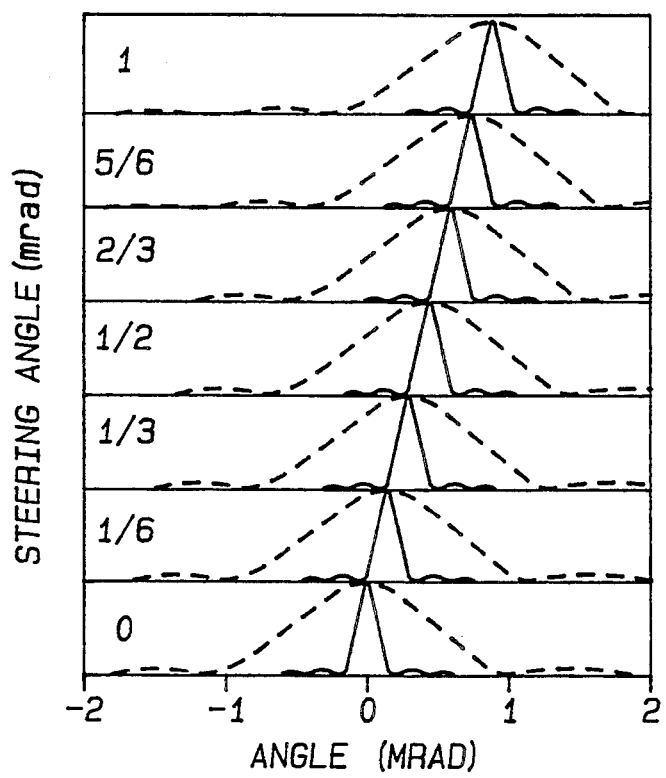
FIG. 3 is a graph illustrative of far-field patterns obtainable from continuous steering of the beam steering system in accordance with the present invention.

The steering angle $\theta$ is determined by the optical properties and shape of the associated microlenses and the relative position of the beam transmitted through the microlenses. FIG. 2 shows a side view of the beam system 10 in which the arrays 22 and 24 have been moved from their aligned position as shown in FIG. 1. In order to effectuate controlled beam steering, the steering array 22 is translationally moved substantially along a plane perpendicular to the beam columns 18 incident thereto so that the microlenses associated therewith are collectively relocated. By translating the steering lens array 22, the divided beam columns 18 that pass through the microlenses are transmitted through a different portion of the microlenses an, thereby steered along a steered path 25. The steering lens array 22 and the combining lens array 24 can be controllably moved independent of one another. However, the steering lens array 22 and the combining lens array 24 are preferably moved in concert with one another so that the steered beams are centered with the combining microlenses so as to avoid adjacent beam interference. For the steering angle $\theta$ as shown in FIG. 2, the steering lens array 22 has been moved a distance A and the combining lens array 24 has been moved a distance B. The translational movement of the arrays 22 and 24 is performed by appropriate actuators (not shown) well known in the art. Such a steering system is adequately defined in Flood et al., mentioned above.

The magnification of the dividing telescope array 13 and the steering telescope array 23 should be substantially inversely proportional to each other so as to produce a single peak in the far-field beam pattern while maintaining substantially the original beam size.

During the process of steering the beam columns 18, the steered beams may be continually redirected along a number of paths such as paths 25A, 25B and 25C according to the steering angle $\theta$. The steering angle 0 is approximately equal to the distance of translational shift divided by the focal length of the associated microlens array. Accordingly, as the size of the optics increase in the high power regime, the required range of shift distances for a comparable field of view generally increases proportionally. It is preferred that the focal length of each microlens of the array 22 remain as short as possible and independent of the optical size so as to achieve a scalable beam steering system 10.

Microlenses of the type applicable for the arrays 16, 18, 22 and 24 discussed above can be configured in any number of ways, including a hexagonal or square array, depending on the cross section of the beam to be steered. Microlenses of this type can be either diffractive or refractive elements, however, diffractive elements are generally preferred because of their accuracy. A person skilled in the art would be able to select the appropriate microlens array. There are many known ways to fabricate a microlens array, including molding, pressing, expansion, photo-etching, etc. However, most fabrication techniques cannot provide a good lens surface near the cell boundaries and corners. The surface simply deviates away from a spherical profile in these regions which reduces the overall beam steering efficiency. This difficulty can be alleviated by using binary lenses for the microlens arrays. A binary lens, well known by those skilled in the art, has stepwise structures which simulate a smooth spherical surface. The diffraction of radiation from these structures results in beam divergence or convergence similar to the function of a lens. The diffraction efficiency depends on the number of levels in the structure. These step structures can be fabricated by repeatedly using a photolithographic technique. In such a process, a mask is used to define the regions where the base material is to be removed. The depth of removal is controlled by the duration of a chemical or ion etching process. A sixteen-level structure would require four repeating processes with a reduced feature size in each successive mask. Although binary lens arrays are not available commercially, they have been fabricated and tested for special applications in many advanced laboratories. Those fabrication techniques can be used readily for this application.

The beam steering system 10 as thus far described above generally provides wide-angle beam steering capability. However, as the plurality of divided beam columns 18 are individually steered, the phase fronts associated therewith may not be on the same plane as they emerge from the lens array 24. As a consequence, the unmatched phase fronts may lead to what is known as discrete beam steering phenomenon in which the phase relationship is matched only at discrete steering angles. Beam steering at angles other than the discrete angles thereby adversely suffers from a resulting energy loss. Accordingly, continuous beam steering through a range of angles will likewise suffer.

The present invention includes the addition of a movable fine steering compensation lens 20 located between the dividing telescope array 13 and the steering telescope array 23. The compensation lens 20 is a converging optical element that is preferably made of a curved piece of glass material which refracts optical energy incident thereto. Of course, other optical elements, such as a diffractive optical element or a plurality of optical elements may be applicable. Compensation lens 20 provides a selected amount of predetermined phase compensation to the divided beam columns 18 by directing the divided beams 18 through selected regions of the curved optical surface. Accordingly, the amount of phase compensation is dependent on the optical properties provided by the portion of the lens through which the optical energy penetrates.

The compensation lens 20 includes a linear aperture (not shown) that is larger than the total cross-sectional area covered by the divided beam columns 18 and has a substantially uniform refractive surface contour for providing phase compensation throughout the cross-sectional area of the optical energy incident thereto. The compensation lens 20 has a focal length much longer than the focal length of the individual microlenses of the array 16. During steering angle changes, the compensation lens 20 is translationally shifted along a plane perpendicular to the divided beam columns 18 for purposes of changing the surface region through which each of the divided beam columns 18 project. The amount the compensation lens 20 is shifted is dependent on the amount the steering array 22 is shifted to steer the beam. Shifting of the lens 20 is performed by an appropriate actuation device (not shown). This is done in order to provide a predetermined amount of phase compensation and bring the phase fronts in the divided beams in line. Accordingly, a translational shift of compensation lens 20 provides a change in the predetermined phase compensation among the divided beam columns 18 which compensates for the phase offset created by the steering array 22. The shift of the compensation lens 20 divided by the focal length is approximately equal to the required phase adjustment distance (less than one wavelength) divided by the microlens size.

In a preferred embodiment, the compensation lens 20 is a single movable refractive lens for collectively providing fine beam steering which compensates for phase differences which may otherwise exist among the plurality of beam columns 18 at discrete steering angles. The phase differences may be caused by the steering microlens array 22 and may result in a poor far-field beam. The translational movement of the fine steering compensation lens 20 is accomplished such that known phase mismatches which occur at different steering angles $\theta$ are compensated in advance by a predetermined phase compensation. Accordingly, the phase compensation is continually changed according to the movement of steering lens array 22 simply by moving compensation lens 20.

In operation, the beam steering system 10 receives the beam of optical radiation 12 along the input path 15 generally from a laser (not shown). The optical beam 12 is projected through the dividing telescope array 13 which in turn focuses the optical beam 12 into a plurality of divided beam columns 18. The fine steering compensation lens 20 is translationally shifted so as to provide a selected predetermined amount of phase compensation amongst the plurality of divided beam columns 18, which would otherwise suffer from unmatched phase shifts caused by the steering lens array 22 over a continuous beam steering operation. The phase compensated divided beam columns 18 are then transmitted through the steering telescope array 22 which causes each of the plurality of divided beams to be redirected along the path 25. In so doing, the steering array 23 may be translationally shifted so as to subject the beam columns 18 incident thereto to selected surface regions thereof. In doing so, the optical beam 26 may be continually steered along a number of second beam paths such as paths 25A, 25B and 25C.

FIG. 5 illustrates far-field beam pattern intensities obtained from a continuous steering of an optical beam according to one example of the beam steering system 10 described herein. As the optical beam is continuously steered, the beam intensity at a number of selected steering angles $\Theta$ provides a relatively uniform beam output which is shown as a substantially smooth single peak. This is because the phase fronts associated with each of the divided beam columns 18 have been properly compensated for prior to beam redirection so that the far-field beam intensity has a uniform intensity over a continuous steering range.

In view of the foregoing, it can be appreciated that the present invention enables the user to achieve an optical beam steering system 10. Thus, while this invention has been disclosed herein in connection with a particular example thereof, no limitation is intended thereby except as defined in the following claims. This is because a skilled practitioner recognizes that other modifications can be made without departing the spirit of this invention after studying the specification and drawings.

What is claimed:

1. A system for steering a beam of optical radiation which minimizes phase deviations within said beam, said system comprising:
    dividing means for receiving and dividing said beam of optical radiation into a plurality of divided beam columns;

beam steering means optically coupled to said dividing means for collectively steering each of the divided beam columns along a second path; and a compensation lens accepting said plurality of divided beam columns, said compensation lens compensating for phase differences which may be present among said divided beam columns.

2. The system as defined in claim 1 wherein said compensation lens is operatively coupled between said dividing means and said beam steering means.

3. The system as defined in claim 1 wherein said compensation lens is a refractive optical element having a surface area larger than a cross-sectional area covered by said divided beam columns.

4. The system as defined in claim 1 further comprising beam combining means for collectively recombining the redirected divided beam columns so as to provide a recombined far-field beam of optical radiation.

5. The system as defined in claim 4 wherein said beam combining means is an array of binary microlenses which collectively focus said steered divided beam columns into a far-field beam.

6. The system as defined in claim 1 wherein said beam dividing means is a telescopic microlens array including a first and second microlens array, wherein each microlens array includes a plurality of binary microlenses.

7. The system as defined in claim 1 wherein said beam steering means is a microlens array including a plurality of binary microlenses which are collectively moved along a plane substantially perpendicular to said beam columns so that each of the microlenses steers one of said divided beam columns.

8. The system as defined in claim 6 wherein said beam steering means and said compensation lens are movable substantially perpendicular to the divided beam columns independent of one another.

9. The system as defined in claim 1 wherein said beam of optical radiation is a laser beam.

10. An optical beam steering system which minimizes phase deviations comprising:

beam dividing means for receiving and dividing an optical beam into a plurality of divided beam columns;

beam steering means including a plurality of microlenses operatively coupled to said beam dividing means for steering said plurality of divided beam columns;

a refractive optical compensation lens operatively coupled between said beam steering means and said beam dividing means, said compensation lens having a surface area which receives said plurality of divided beams and provides phase compensation among said divided beams; and beam combining means optically coupled to said beam steering means for recombining the redirected plurality of divided beam columns so as to provide a single far-field beam output.

11. The system as defined in claim 10 wherein said compensation lens is a movable refractive optical element which has a surface area larger than the area covered by said divided beams, said compensation lens being movable in a direction substantially perpendicular to the divided beam columns.

12. The system as defined in claim 10 wherein said beam steering means includes a microlens array having a plurality of binary microlenses which are collectively moved along a plane substantially perpendicular to said beam columns so that each of said microlenses steers one of said divided beam columns.

13. The system as defined in claim 10 wherein said dividing means is two binary microlens arrays positioned substantially perpendicular to each other, each array including a plurality of binary microlenses.

14. The system as defined in claim 10, wherein said beam of optical radiation comprises a laser beam.

15. In a steering system for steering a laser beam having a dividing array for dividing a laser beam into a plurality of divided beams and a steering array for redirecting the plurality of divided beams along a desired path, further comprising:

a movable compensation lens operatively coupled between the dividing array and the steering array for providing phase compensation amongst the plurality of divided beams so that said beam may be continuously steered while exhibiting minimal phases deviations.

16. The system as defined in claim 15 wherein said compensation lens comprises a refractive optical material that is controllably moved along a plane substantially perpendicular to said divided beams.

17. A method for controllably steering an optical beam while minimizing phase deviations comprising:

receiving an optical beam of radiation directed along a first path;

dividing said optical beam into a plurality of divided beam columns;

transmitting said plurality of divided beam columns through a refractive optical compensation lens so as to provide phase compensation among the plurality of divided beam columns; and collectively steering each of said divided beams with a microlens steering array so as to redirect each beam along a second path.

18. The method defined in claim 17 further comprising the step of recombining said steered divided beam columns so as to form a single far-field optical beam projecting along said second path.

19. An optical beam steering system comprising:

a beam dividing array, said beam dividing array including a first array of microlenses which receives an optical beam and separates the optical beam into a plurality of individual optical beams and a second array of microlenses which receives the individual optical beams from the first array and generates a plurality of substantially parallel optical beams, wherein microlenses in the first microlens array are optically coupled to microlenses in the second microlens array; and a beam steering and combining array, said beam steering and combining array including a beam steering microlens array positioned to receive the plurality of optical beams, said beam steering microlens array operable to be moved in a direction substantially perpendicular to the path of the parallel optical beams so as to cause the direction of the optical beams to be steered, said beam steering and combining array further including a beam combining microlens array positioned to receive the steered beams from the beam steering microlens array, said beam combining microlens array combining the individual optical beams into a single beam in the steered direction.

20. The system according to claim 19 further comprising a compensation lens positioned between the beam dividing array and the beam steering and combining array such that the compensating lens receives the plurality of individual beams and compensates for phase deviations caused by the movement of the beam steering microlens array.

21. The system according to claim 20 wherein the compensation lens is movable in the direction substantially perpendicular to the direction of the plurality of beams.

* * * * *